(12) United States Patent
Matsumura et al.

(10) Patent No.: US 10,131,002 B2
(45) Date of Patent: *Nov. 20, 2018

(54) CUTTING INSERT HAVING VARYING RAKE ANGLE AND VARIABLE-WIDTH LAND, AND CUTTING TOOL

(71) Applicant: TUNGALOY CORPORATION, Iwaki-shi Fukushima (JP)

(72) Inventors: Takahiro Matsumura, Iwaki (JP); Satoru Yoshida, Iwaki (JP)

(73) Assignee: TUNGALOY CORPORATION, Iwaki-shi, Fukushima (JP)

( * ) Notice: Subject to any disclaimer, the term of this patent is extended or adjusted under 35 U.S.C. 154(b) by 50 days.

This patent is subject to a terminal disclaimer.

(21) Appl. No.: 15/313,109

(22) PCT Filed: May 25, 2015

(86) PCT No.: PCT/JP2015/064957
§ 371 (c)(1),
(2) Date: Nov. 22, 2016

(87) PCT Pub. No.: WO2015/182562
PCT Pub. Date: Dec. 3, 2015

(65) Prior Publication Data
US 2017/0189972 A1   Jul. 6, 2017

(30) Foreign Application Priority Data
May 26, 2014 (JP) ................................. 2014-107706

(51) Int. Cl.
*B23C 5/20* (2006.01)
*B23C 5/06* (2006.01)
*B23C 5/10* (2006.01)

(52) U.S. Cl.
CPC ................ *B23C 5/06* (2013.01); *B23C 5/109* (2013.01); *B23C 5/20* (2013.01); *B23C 5/202* (2013.01);
(Continued)

(58) Field of Classification Search
CPC ........... B23C 5/20; B23C 5/202; B23C 5/207; B23C 5/109; B23C 5/06;
(Continued)

(56) References Cited

U.S. PATENT DOCUMENTS 5,544,984 A   8/1996  Pantzar
5,807,031 A   9/1998  Arai et al.
(Continued)

FOREIGN PATENT DOCUMENTS

CN   102781612 A   11/2012
EP   2412646       2/2012
(Continued)

OTHER PUBLICATIONS

International Search Report dated Aug. 18, 2015 issued in counterpart International (PCT) Application (No. PCT/JP2015/064957).
(Continued)

*Primary Examiner* — Ryan Rufo
(74) *Attorney, Agent, or Firm* — Studebaker & Brackett PC

(57) ABSTRACT

A polygonal cutting has opposing first and second end surfaces connected by a side surface, and a plurality of cutting edges formed between the end surfaces and the side surface. Each cutting edge is formed at corner and includes a corner cutting edge and a major cutting edge connected to the corner cutting edge. A rake surface formed along the cutting edge on first the end surface is inclined toward the second end surface. In a side view of the cutting insert, the major cutting edge includes an inclined part which is
(Continued)

inclined so as to approach the second end surface from the corner cutting edge. A portion of the rake surface along the inclined part is formed such that an angle of inclination toward the second end surface increases toward the corner in a direction along the intersecting edge between the first end surface and the side surface.

18 Claims, 13 Drawing Sheets

(52) U.S. Cl.
CPC ........ *B23C 5/207* (2013.01); *B23C 2200/085* (2013.01); *B23C 2200/125* (2013.01); *B23C 2200/205* (2013.01); *B23C 2200/208* (2013.01); *B23C 2200/286* (2013.01); *B23C 2200/366* (2013.01); *B23C 2210/168* (2013.01)

(58) Field of Classification Search
CPC .... B23C 2200/0422; B23C 2200/0427; B23C 2200/366; B23C 2200/208
See application file for complete search history.

(56) References Cited

U.S. PATENT DOCUMENTS

| | | | | |
|---|---|---|---|---|
| 5,810,521 A | * | 9/1998 | Pantzar | B23B 27/145 |
| | | | | 407/114 |
| 6,540,447 B2 | * | 4/2003 | Nagata | B23C 5/2221 |
| | | | | 407/114 |
| 2007/0297865 A1 | * | 12/2007 | Hessman | B23C 5/207 |
| | | | | 407/114 |
| 2010/0150671 A1 | * | 6/2010 | Oprasic | B23C 5/207 |
| | | | | 407/42 |
| 2012/0070240 A1 | * | 3/2012 | Ishi | B23C 5/06 |
| | | | | 407/42 |
| 2012/0155976 A1 | * | 6/2012 | Ishi | B23C 5/06 |
| | | | | 407/33 |
| 2012/0301235 A1 | | 11/2012 | Yoshioka et al. | |
| 2013/0094913 A1 | * | 4/2013 | Yoshida | B23C 5/06 |
| | | | | 407/42 |
| 2013/0142580 A1 | | 6/2013 | Konta | |
| 2013/0336732 A1 | * | 12/2013 | Jansson | B23C 5/06 |
| | | | | 407/47 |
| 2014/0010605 A1 | | 1/2014 | Smilovici et al. | |
| 2014/0314509 A1 | | 10/2014 | Yamamichi | |

FOREIGN PATENT DOCUMENTS

| | | | | |
|---|---|---|---|---|
| EP | 3 124 152 A1 | | 2/2017 | |
| JP | 07-246505 A | * | 9/1995 | ............. B23B 27/14 |
| JP | 08-323510 A | * | 12/1996 | ............. B23B 27/22 |
| JP | H 09-117817 A | | 6/1997 | |
| JP | 2007-021621 A | * | 2/2007 | ............... B23C 5/20 |
| WO | WO 2009096516 A1 | * | 8/2009 | ............... B23C 5/06 |
| WO | WO 2010150907 A1 | * | 12/2010 | ............... B23C 5/06 |
| WO | WO 2011092883 A1 | * | 8/2011 | ............... B23C 5/06 |
| WO | 2013/065347 A1 | | 5/2013 | |

OTHER PUBLICATIONS

Written Opinion dated Aug. 18, 2015 issued in counterpart International (PCT) Application (No. PCT/JP2015/064957).

* cited by examiner

CUTTING INSERT HAVING VARYING RAKE ANGLE AND VARIABLE-WIDTH LAND, AND CUTTING TOOL

RELATED APPLICATIONS

This is a 371 US National Phase of International Patent Application No. PCT/JP2015/064957 filed May 25, 2015, and published as WO 2015/182562A1 on Dec. 3, 2015, which claims priority to JP 2014-107706, filed May 26, 2014. The contents of the aforementioned applications are incorporated by reference in their entirety.

TECHNICAL FIELD

The present invention relates to a cutting insert used for a cutting tool, in particular, a cutting insert used for a rotating tool. The present invention also relates to a body on which the cutting insert is removably mounted and to a cutting tool comprising the cutting insert and the body.

BACKGROUND ART

Conventionally, there has been a cutting insert for rotary cutting, as described in, for example, Patent Document 1. The cutting insert in Patent Document 1 includes two opposing end surfaces, a peripheral side surface extending between these end surfaces, and a plurality of cutting edges extending on an intersecting edge between each of the two end surfaces and the peripheral side surface. Each cutting edge includes a corner cutting edge extending at a certain corner of the relevant end surface, a major cutting edge extending from the corner cutting edge toward an adjacent corner, and a minor cutting edge extending from a side, different from the major cutting edge, of the corner cutting edge. When a plane passing through a middle part between the two end surfaces and extends so as to intersect with the peripheral side surface is defined as a middle plane, the major cutting edge is inclined so as to approach the middle plane as the distance from the adjacent corner cutting edge increases. When such cutting insert is removably mounted onto an insert mounting seat of a tool body, an active cutting edge extends on a leading end side of the tool and an outer circumferential side of the tool, and one end surface relevant to this active cutting edge faces forward in a tool rotating direction and serves as a rake surface. At this time, the active corner cutting edge is located at the foremost position in the tool rotating direction in the active cutting edge, the active major cutting edge extends on the outer circumferential side of the tool body, and the active minor cutting edge extends on the leading end side of the tool. Accordingly, the active cutting edge is cut into a workpiece sequentially from the active corner cutting edge formed at the corner. When the active cutting edge is gradually cut into the workpiece from the corner cutting edge, a resistance applied instantaneously to the entire cutting edge is smaller as compared to a case in which the active corner cutting edge and the active major cutting edge as a whole are simultaneously cut into the workpiece, and the active cutting edge is advantageously resistant to fracture, etc.

CITATION LIST

Patent Document

Patent Document 1: WO2014/6609

SUMMARY

Technical Problem

However, since, as described above, the active cutting edge is cut into the workpiece sequentially from the active corner cutting edge, a load that is applied at the moment when the active cutting edge is cut into the workpiece is focused on the active corner cutting edge. Part of an impact applied to the active corner cutting edge is converted to heat and the generated heat is accumulated around the cutting edge. If heat is accumulated around the cutting edge, the rake surface is prone to the formation of crater wear due to abrasion of chips. In addition, since a rotating tool performs intermittent cutting, the active corner cutting edge is rapidly cooled on an intermittent basis. Since the active corner cutting edge is expanded and contracted repeatedly in association with rapid temperature changes in the cutting edge due to the heating and cooling, fatigue failure is likely to occur.

The present invention has been made in light of the above circumstances and an object of the present invention is to suppress deterioration of a cutting insert due to heat in an active cutting edge.

Solution to Problem

An aspect of the present invention provides a cutting insert, comprising: a first end surface and a second end surface opposing the first end surface; a side surface connecting the first end surface and the second end surface; and at least one cutting edge extending on an intersecting edge between the first end surface and the side surface, each cutting edge including: a corner cutting edge extending at a corner of the first end surface; and a major cutting edge connected to the corner cutting edge, wherein: the first end surface is provided with a rake surface along the cutting edge, the rake surface being inclined toward the second end surface as the distance from the cutting edge increases; in a side view of the cutting insert, the major cutting edge includes an inclined part which is inclined so as to approach the second end surface from the corner cutting edge; and a portion of the rake surface along the inclined part is formed such that an angle of inclination toward the second end surface increases toward the corner in a direction along the intersecting edge between the first end surface and the side surface.

In the cutting insert having such configuration, the first end surface is provided with a rake surface along the cutting edge and the rake surface is inclined toward the second end surface side as the distance from the cutting edge increase, and in the side view of the cutting insert, the major cutting edge includes the inclined part which is inclined so as to approach the second end surface from the corner cutting edge, and a portion of the rake surface along the inclined part is formed such that an angle of inclination toward the second end surface increases toward the corner in the direction along the intersecting edge between the first end surface and the side surface. In other words, a rake angle of the rake surface portion along the inclined part of the major cutting edge becomes larger with respect to a positive side toward the corner in a direction along a side edge part of the first end surface. Thus, it is possible to mitigate an impact applied to the active corner cutting edge when the active cutting edge is cut into the workpiece and to make the cutting edge less likely to be subjected to heat accumulation. By making the cutting edge less likely to be subjected to heat accumulation, softening of, for example, an area around the cutting edge can be suppressed and the generation of crater wear due to the abrasion of chips can be suppressed. Accordingly, it is possible to appropriately suppress the deterioration of the cutting insert due to heat in the active cutting edge.

In the side view of the cutting insert, the major cutting edge is preferably curved so as to be recessed toward the second end surface.

As viewed from a direction facing the first end surface, the major cutting edge preferably has a first major cutting edge portion and a second major cutting edge portion that forms an obtuse interior angle θ with the first major cutting edge portion. The first end surface may be provided with a land between the cutting edge and the rake surface, and in the land, a width of a first land extending between the first major cutting edge and the rake surface may increase toward the corner. A width of a second land extending between the second major cutting edge portion and the rake surface preferably increases toward the corner, and a rate of increase of the width of the first land is preferably larger than a rate of increase of the width of the second land.

The first major cutting edge portion is preferably shorter than the second major cutting edge portion.

The cutting edge preferably includes a minor cutting edge connected to the corner cutting edge on an opposite side of the major cutting edge. In this case, as viewed from the direction facing the first end surface, an interior angle of the corner may be smaller than the interior angle between the first major cutting edge portion and the second major cutting edge portion.

When the cutting insert further comprises a through hole that penetrates the first end surface and the second end surface, n (where n is an integer of 2 or higher) cutting edges extending on the intersecting edge between the first end surface and the side surface are preferably arranged in n-fold symmetry about a central axis of the through hole, and the cutting insert is preferably 180-degree rotationally symmetric about an axis that is orthogonal to the central axis of the through hole.

In the cutting insert, a first inclined surface and a second inclined surface are preferably formed in the side surface, the second inclined surface being arranged on a second end surface side with respect to the first inclined surface and located apart from the first inclined surface in a circumferential direction of the cutting insert. The first inclined surface may be inclined so as to face an inner side of the cutting insert as a distance to the second end surface decreases; and the second inclined surface may be inclined so as to be located on the inner side of the cutting insert as a distance to the first end surface decreases.

The present invention also resides in a body on which the above-mentioned cutting insert is removably mounted. Another aspect of the present invention provides a body comprising an insert mounting seat for mounting the cutting insert, wherein: the insert mounting seat includes a first side wall surface; and the first side wall surface includes a projected part that is brought into contact with the second inclined surface formed in the side surface of the cutting insert. An outer contour of the body may be substantially cylindrical. In this case, the insert mounting seat may further include a second side wall surface located on an outer circumferential side of the body with respect to the first side wall surface; and the second side wall surface may include a projected part that is brought into contact with the first inclined surface formed in the side surface of the cutting insert.

A further aspect of the present invention provides a cutting tool comprising the above-mentioned cutting insert and a body on which the cutting insert is removably mounted.

DESCRIPTION OF EMBODIMENTS

A cutting insert and a cutting tool according to an embodiment of the present invention will now be described with reference to the attached drawings.

Figure 1:
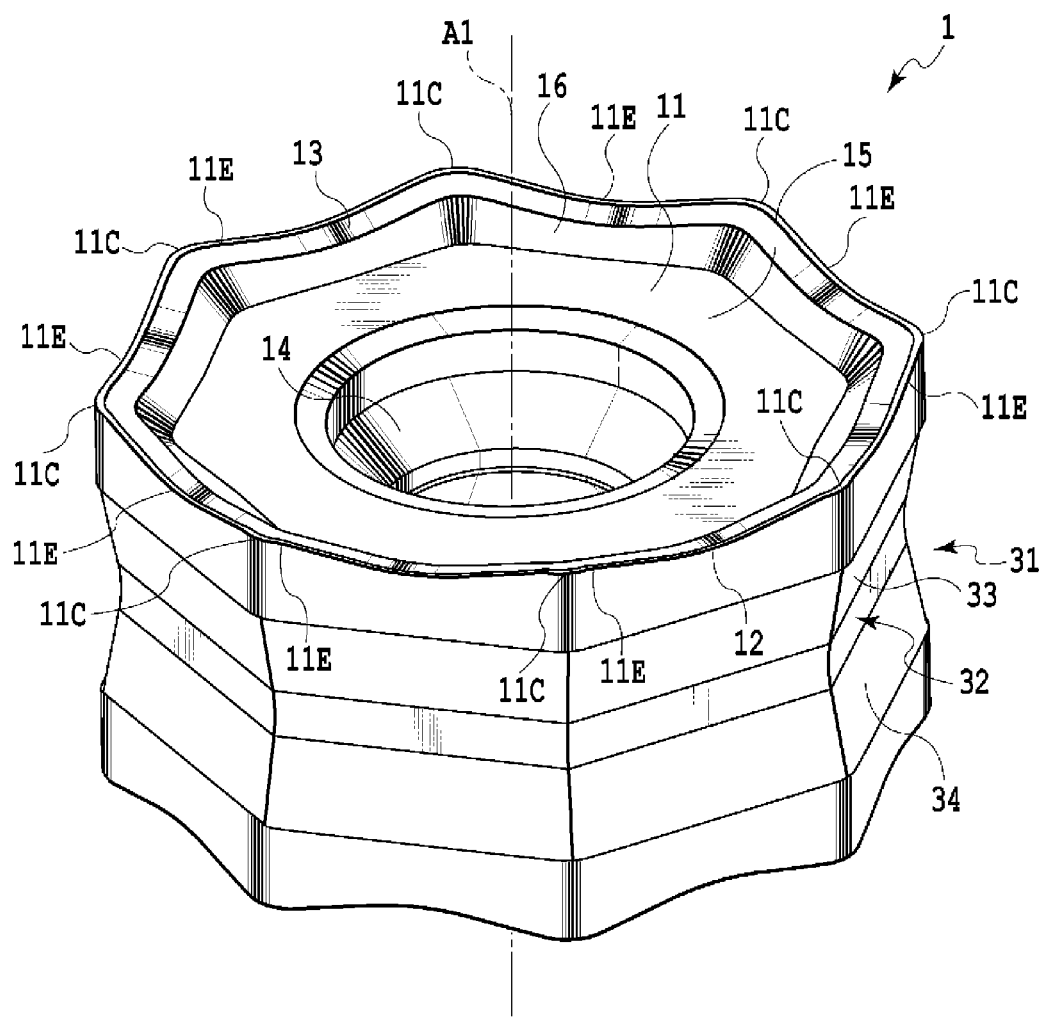
FIG. 1 is a perspective view showing a cutting insert according to an embodiment of the present invention.
Figure 2:
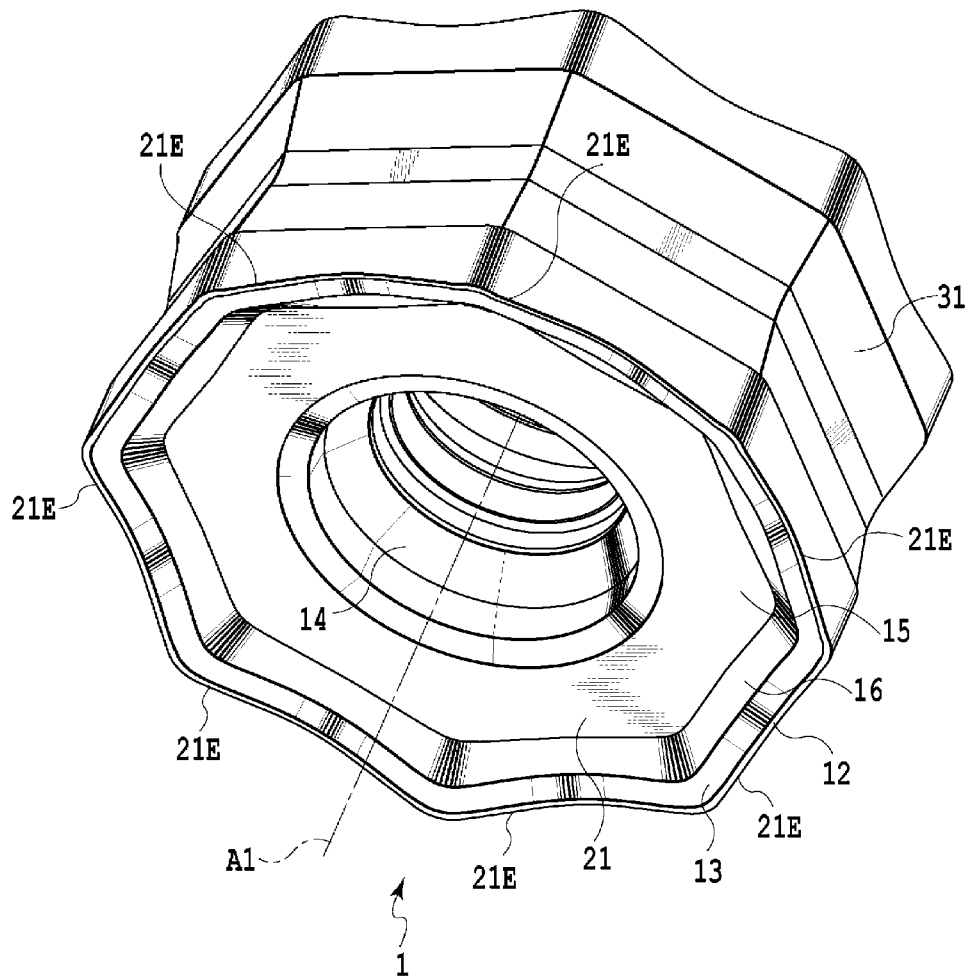
FIG. 2 is a perspective showing the cutting insert of FIG. 1 as viewed from another angle.
Figure 3:
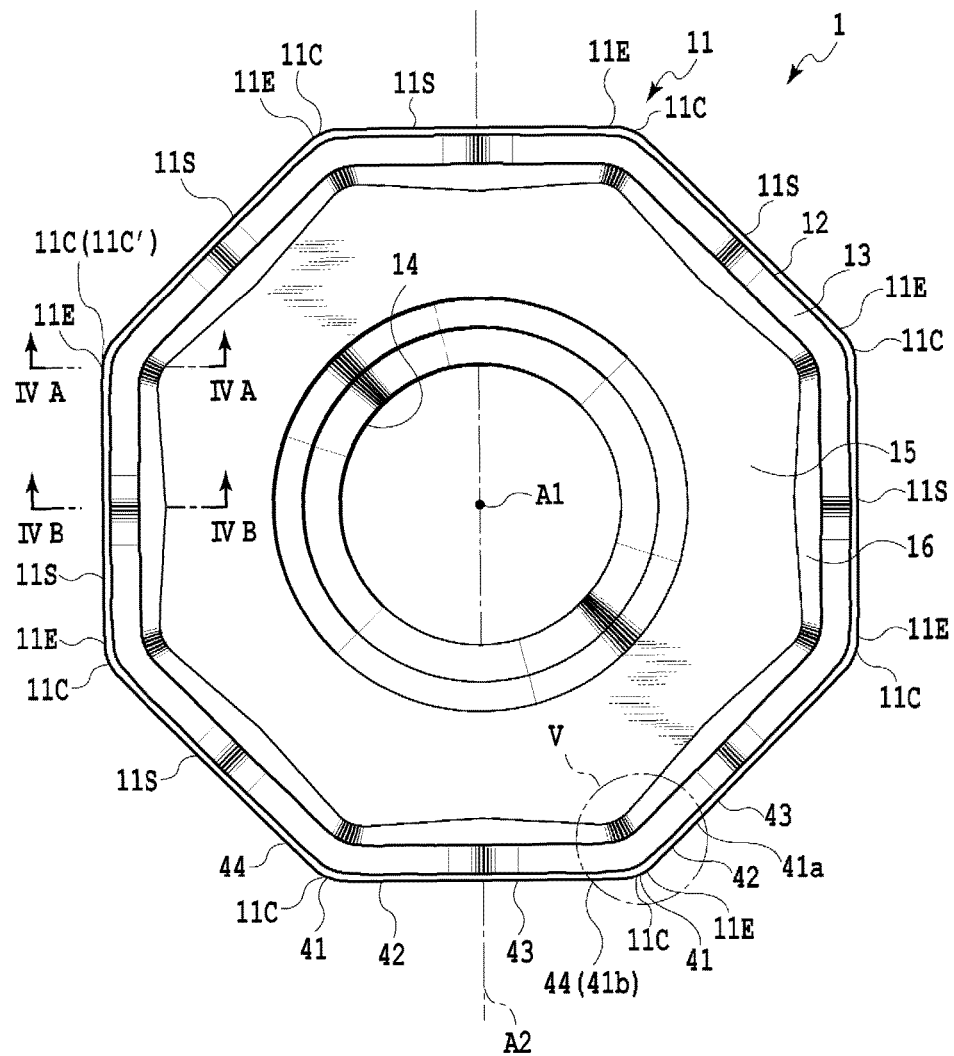
FIG. 3 is a top view showing the cutting insert of FIG. 1.

A cutting insert 1 according to the embodiment will now be described with reference to FIGS. 1 to 6. The cutting insert 1 includes two opposing end surfaces 11, 21, a peripheral side surface (hereinafter referred as the "side surface") 31 extending between the end surfaces, and a plurality of cutting edges 11E, 21E extending in an intersecting edge between each of the end surfaces and the side surface. As shown in FIG. 3, the shape of the first end surface 11 in the two end surfaces of the cutting insert 1 is a shape having eight corners and eight side edge parts connecting between adjacent corners and the shape can be approximated to an octagonal shape. The second end surface 21 in the two end surfaces has the same shape as the first end surface 11. The first end surface 11 and the second end surface 21 are connected via the side surface 31. Eight side surface portions constituting the side surface 31 are each provided with a recessed part 32. The eight side surface portions are formed continuously in a circumferential direction about an axis A1, extending so as to penetrate the first and second end surfaces of the cutting insert 1, and the eight recessed parts 32 are also formed continuously in the circumferential direction. In the following description, the first end surface 11 and second end surface 21 will be referred to as the "upper surface 11" and the "lower surface 21," respectively, for the sake of convenience. However, this is not intended to limit the orientation of the cutting insert.

A through hole 14 is formed at a central part of the upper surface 11 and a central part of the lower surface 21, and the through hole 14 penetrates the upper and lower surfaces in a direction at right angles to these surfaces. When the polygonal cutting insert 1 is mounted on a body of a cutting tool, a fastener such as a screw is inserted into the through hole 14 to fix the cutting insert 1 onto an insert mounting seat formed on the body. In accordance with the substantially octagonal shape of the upper and lower surfaces 11, 21, the cutting insert 1 is formed in eightfold symmetry about a central axis of the through hole 14 (i.e., an axis A1 defined so as to penetrate the upper and lower surfaces 11, 21). Accordingly, the plurality of cutting edges 11E extending on the intersecting edge between the upper surface 11 and the side surface 31 is arranged in a rotational symmetry about the central axis of the through hole 14. In addition, the cutting insert 1 has the same shape even when it is turned upside down. In other words, the cutting insert 1 has a 180-degree rotationally symmetric shape about a second axis A2 that is orthogonal to the central axis A1 of the through hole 14 and passes through the side surface 31 (FIG. 3 shows the second axis as one example). Accordingly, the plurality of cutting edges 11E extending on the intersecting edge between the upper surface 11 and the side surface 31 is 180-degrees rotationally symmetric about the second axis A2 to the plurality of cutting edges 21E extending on the intersecting edge between the lower surface 21 and the side surface 31, and the cutting edges 11E and 21E have the same configuration. Accordingly, in the following description, only features related to the upper surface 11 will be described and the explanation of features related to the lower surface 21 will be omitted. That is to say, the shape features owned by the upper surface 11 are also owned by the lower surface 21 in the same way and the redundant description thereof will be omitted. Despite the 180° rotational symmetry about the second axis A2, the cutting insert lacks mirror symmetry about the middle plane M due to shapes of the individual cutting edges 11A, 21E in the circumferential direction.

The upper surface 11 has eight cutting edges 11E extending continuously along an edge part, i.e., a side edge part, of the upper surface 11. Each cutting edge 11E is associated with one corner 11C of the upper surface 11.

A land 12 and a rake surface 13 extend from the cutting edge 11E side toward the through hole 14 side on the upper surface 11. The land 12 is inclined so as to approach the lower surface 21 as the distance from the cutting edge 11E increases (in a direction orthogonal to the cutting edge in FIG. 3). In short, the land 12 has a positive land angle. When a virtual plane passing through the side surface 31 so as to divide the cutting insert 1 into halves orthogonal to the central axis of the through hole 14 is defined as a middle plane M, the land 12 is adjacent to the cutting edge 11E and inclined so as to approach the middle plane M as the distance from the cutting edge 11E increases. The rake surface 13 is adjacent to the land 12 and inclined so as to approach the lower surface 21 as the distance from the cutting edge 11E increases (in the direction orthogonal to the cutting edge in FIG. 3). In short, the rake surface 13 has a positive rake angle. That is to say, the rake angle 13 is inclined so as to approach the middle plane M as the distance from the cutting edge 11E increases. The upper surface 11 includes a connecting inclined surface 16 between the rake surface 13 and a contacting surface 15 extending around the through hole 14, the connecting inclined surface 16 connecting the rake surface 13 and the contacting surface 15. The contacting surface 15 is a surface that can be brought into contact with the insert mounting seat formed on the body, i.e., a seating surface. In the present embodiment, the contacting surface 15 extends orthogonal to the central axis of the through hole 14.

Figure 4A:
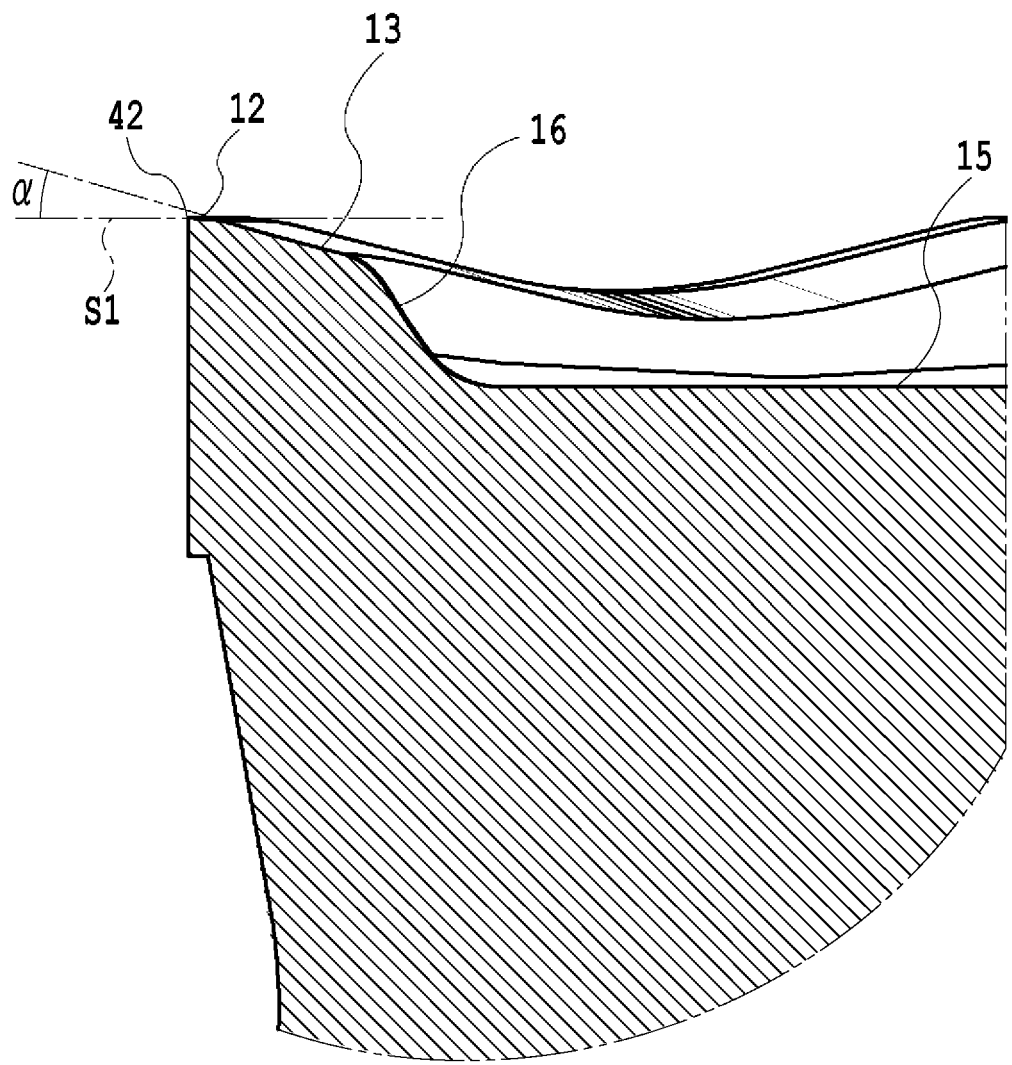
FIG. 4A is a cross-sectional view showing the cutting insert of FIG. 1, taken along the cutting-plane line IVA-IVA in FIG. 3.
Figure 4B:
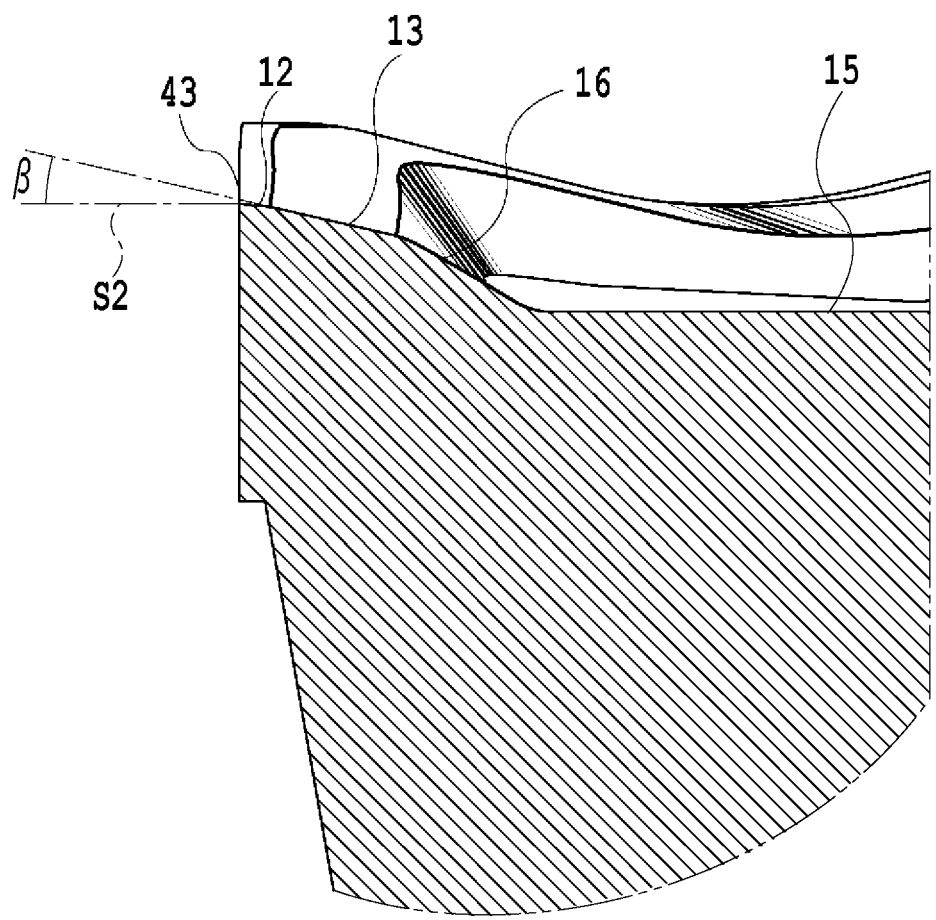
FIG. 4B is a cross-sectional view showing the cutting insert of FIG. 1, taken along the cutting-plane line IVB-IVB in FIG. 3.

The rake surface 13 is formed such that the angle of inclination toward the lower surface 21 is larger than that of the adjacent land 12. In addition, the rake surface 13 is formed such that the angle of inclination toward the lower surface 21 increases toward the corner 11C in a direction along the side edge part of the upper surface 11 (the intersecting edge between the upper surface 11 and the side surface 31). More specifically, this means that the inclination angle of the rake surface relative to the middle plane M in a direction orthogonal to the cutting edge in FIG. 3 in the present embodiment is maximized in the vicinity of the corner 11C and minimized at a position farthest away from the corner 11C (near the middle between adjacent corners 11C). That is to say, in a top view (or a planar view) of the cutting insert 1 in FIG. 3, in a first virtual plane defined so as to intersect at right angles with the cutting edge (e.g., in FIGS. 4A and 4B), when a second virtual plane is defined so as to be orthogonal to the central axis of the through hole 14, the angle of the rake surface relative to the second virtual plane is maximized in the vicinity of the corner 11C and minimized at a position farthest away from the corner 11C. FIG. 4A is a partial cross-sectional view showing the cutting insert 1 taken along the cutting-plane line IVA-IVA which is orthogonal to the cutting edge 11E at its intersecting portion in FIG. 3. FIG. 4B is a partial cross-sectional view showing the cutting insert 1 taken along the cutting-plane line IVB-IVB which is orthogonal to the cutting edge 11E at its intersecting portion in FIG. 3. However, as is obvious from FIG. 3, the cutting-plane line IVA-IVA is located in the vicinity of one corner 11C' and the cutting-plane line IVB-IVB is located substantially at a middle of a side edge part 11S between adjacent corners 11C and located farther away from the corner 11C' with respect to the cutting-plane line IVA-IVA. In FIG. 4A, an angle α of the rake surface 13 relative to a virtual plane S1 which is defined so as to be orthogonal to the central axis of the through hole 14 is 16 degrees. On the other hand, in FIG. 4B, an angle β of the rake surface 13 relative to the virtual plane S2 which is defined so as to be orthogonal to the central axis of the through hole 14 is 13 degrees. In this way, the rake surface 13 is formed such that its inclination angle gradually increases from the position farther away from the corner 11C' toward the corner 11C'. It should be noted that, in FIG. 3, the cutting-plane line IVA-IVA intersects with a first major cutting edge 42 of a major cutting edge 41a (which will be described later) and the cutting-plane line IVB-IVB intersects with a second major cutting edge 43 of the major cutting edge 41a.

FIGS. 4A and 4B also show the connecting inclined surface 16 in addition to the land 12 and the rake surface 13. As shown in FIGS. 4A and 4B, an inclination angle of the connecting inclined surface 16 relative to a virtual plane defined so as to be orthogonal to the central axis of the through hole 14 is larger than the inclination angle of the rake surface 13. It should be noted that the inclination angle of the rake surface 13 in the direction orthogonal to the cutting edge and the inclination angle of the connecting inclined surface 16 in FIG. 3 are defined with reference to virtual planes (e.g., the virtual planes S1, S2) that are defined so as to be orthogonal to the central axis of the through hole 14 and pass through the cutting edge 11E as shown in FIG. 4A or 4B. Herein, these virtual planes S1, S2 are parallel to the contacting surface 15 on the upper surface 11 and the contacting surface 15 on the lower surface 21 and to the middle plane M. In the following description, the inclination angle of the rake surface 13 in the direction orthogonal to the cutting edge in FIG. 3 will be referred to as an inclination angle of the rake surface relative to the middle plane in some context. Similarly, regarding the other surface parts, e.g., the land 12, its inclination angle will be referred to as an inclination angle of the land relative to the middle plane in some context.

Each cutting edge 11E is formed on the corner 11C and the side edge part 11S of the upper surface 11. Each cutting edge 11E is associated with one corner 11C as described above. Each cutting edge 11E has a corner cutting edge 41 extending at one corner 11C, a major cutting edge 41a extending from the first corner cutting edge 41 toward another corner 11C, and a minor cutting edge 41b extending from the first corner cutting edge 41 toward the opposite side of the major cutting edge 41a. The cutting edge 11E will now be described in more detail with the corner cutting edge 41 being referred to as a first corner cutting edge.

Each cutting edge 11E is a cutting edge portion, being a group, having a set of the first corner cutting edge 41, the major cutting edge 41a and the minor cutting edge 41b. It should be noted that, since the eight cutting edges 11E are formed continuously to each other, the major cutting edge 41a is connected to a minor cutting edge 41b of an adjacent cutting edge (i.e., an adjacent cutting edge portion) 11E and the minor cutting edge 41b is connected to the major cutting edge 41a of an adjacent cutting edge 11E on the opposite side. Accordingly, the entire intersecting edge between the upper surface 11 and the side surface 31 can be regarded as one cutting edge and, in such case, such one cutting edge is a group of eight cutting edge portions 11E.

Figure 5:
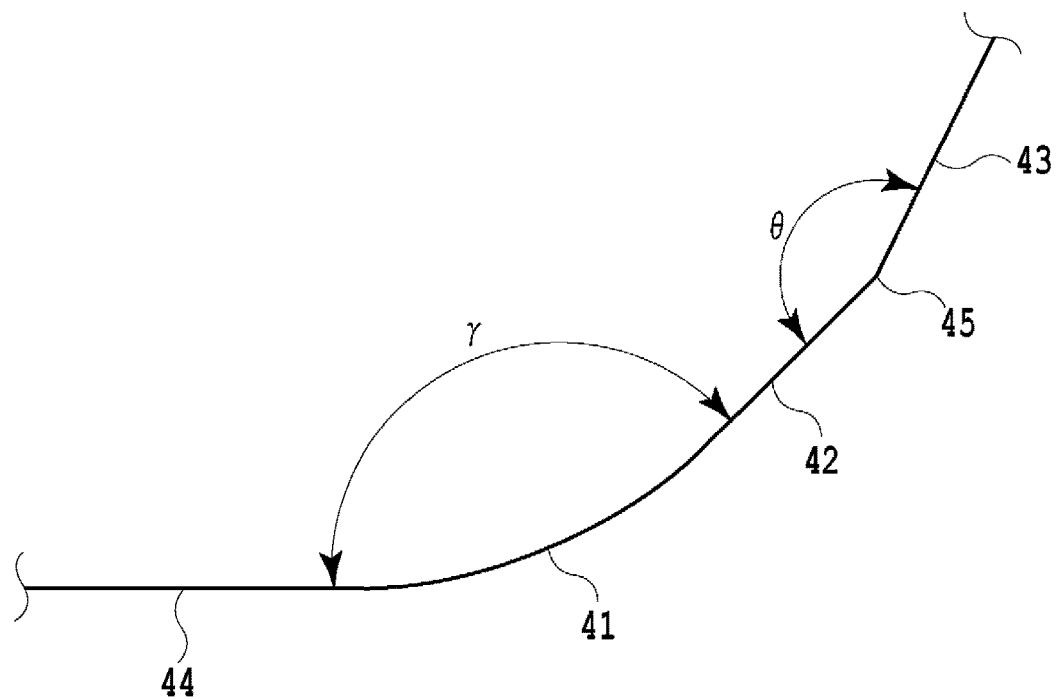
FIG. 5 is an enlarged top view schematically showing part of a cutting edge in the cutting insert of FIG. 1, which is an enlarged view showing a portion corresponding to an area V in FIG. 3

FIG. 5 shows a portion (area V in FIG. 3) around a corner 11C related to one cutting edge 11E in an enlarged manner. However, it should be noted that the enlarged view of FIG. 5 is a schematic view which is depicted with the angle and length of each part being exaggerated in order to aid in easier understanding of the feature of each part. The first corner cutting edge 41 is curved toward the outer side of the cutting insert 1. The major cutting edge 41a includes a first major cutting edge 42 and a second major cutting edge 43. The first major cutting edge 42, being a first side edge part, is connected to one side of the first corner cutting edge 41 and the minor cutting edge 41b, serving as a flat cutting edge 44, is connected to the other side of the first corner cutting edge 41. A second corner cutting edge 45 is connected to the first major cutting edge 42 on the opposite side of the first corner cutting edge 41. The second corner cutting edge 45 is connected to a linear second side edge part and this second side edge part is the second major cutting edge 43. The second major cutting edge 43 is longer than the first major cutting edge 42. It should be noted that, although the relatively short first major cutting edge 42 and the relatively long second major cutting edge are connected with a corner part (i.e., a portion corresponding to the second corner cutting edge) interposed therebetween in FIG. 5, the first major cutting edge and the second major cutting edge can function in an integrated manner as the major cutting edge 41a.

As schematically shown in FIG. 5, the second major cutting edge 43 and the first major cutting edge 42 intersect with each other such that an interior angle θ is an obtuse angle. In the present embodiment, the intersecting angle θ is 175 degrees. In FIG. 5, although an interior angle γ formed by the flat cutting edge 44 and the first major cutting edge 42 is an obtuse angle, the interior angle γ is smaller than the interior angle θ formed by the second major cutting edge 43 and the first major cutting edge 42. The interior angle γ corresponds to the interior angle of the corner 11C.

Figure 6:
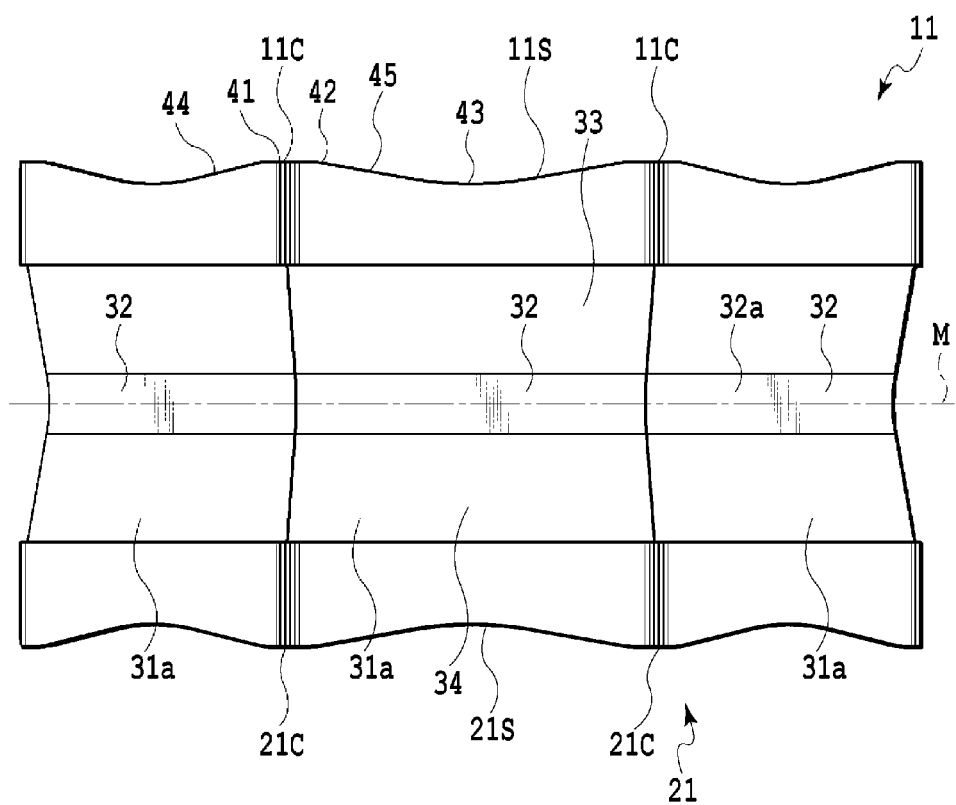
FIG. 6 is a side view showing the cutting insert of FIG. 1.

In a side view of the cutting insert 1 as shown in FIG. 6, the first corner cutting edge 41 is located farthest away from the middle plane M. The cutting edge portion is curved so as to be recessed between adjacent corners 11C. Thus, the first major cutting edge 42 is inclined so as to approach the middle plane M (i.e., so as to approach the lower surface 21) as the distance from the first corner cutting edge 41 increases. The second major cutting edge 43 has a recessed curve shape which is recessed toward the middle plane M (i.e., toward the lower surface 21). In the second major cutting edge 43, the lowermost position of the curved portion closest to the middle plane M, i.e., the lower surface 21, in a side view is located near the middle of the side edge part 11S between the corners 11C. Accordingly, part of the second corner cutting edge 45 is inclined so as to approach the middle plane M as the distance from the relevant first corner cutting edge increases in a side view. A portion of the major cutting edge 41a which is inclined so as to approach the middle plane M, i.e., the lower surface 21, as the distance from the first corner cutting edge 41 increases (a portion from the first major cutting edge 42 to the vicinity of the lowermost point of the second major cutting edge 43) may be referred to as an inclined part in the major cutting edge 41a. In addition, the entire cutting edges formed on the upper surface 11 are formed at a position higher than the contacting surface 15. In other words, a distance from an arbitrary part of the cutting edge on the upper surface 11 to the middle plane M is longer than a distance from the contacting surface 15 to the middle plane M.

The inclination angle of the land 12 in a direction orthogonal to the cutting edge in FIG. 3 is constant at any position, which is 5 degrees in the present embodiment. It should be noted that the inclination angle of the land is defined with reference to a virtual plane that is defined so as to be orthogonal to the central axis of the through hole 14 and that passes through the cutting edge 11E as shown in FIG. 4A or 4B, in the same way as the inclination angle of the rake surface 13.

When the length from an edge of the upper surface 11 to an edge line between the land 12 and the rake surface 13 in a top view of the cutting insert 1 is defined as a "width" of the land, the width of a land (a first land) 12a adjacent to the first major cutting edge 42 increases toward the first corner cutting edge 41. In the first major cutting edge 42 of the present embodiment, the width of a land at a position corresponding to an end farther from the first corner cutting edge 41 is about 0.20 mm and the width of a land at a position corresponding to a connecting part with the first corner cutting edge 41 is about 0.30 mm.

The width of a land (a second land) 12b adjacent to the second major cutting edge 43 also increases toward the first corner cutting edge 41 in the same way as the first land adjacent to the first major cutting edge 42. However, a position with the narrowest width in the second land may be a position closest to the middle plane M in the side view of the cutting insert or a position farther away from the first corner cutting edge of the common cutting edge 11E. In such case, the second land 12b may have substantially the same width in an area farther away from the first corner cutting edge than the narrowest width position is away from the first corner cutting edge.

A rate of increase of the land adjacent to the first major cutting edge 42 is larger than a rate of increase of the width of the land adjacent to the second major cutting edge 43.

Figure 12:
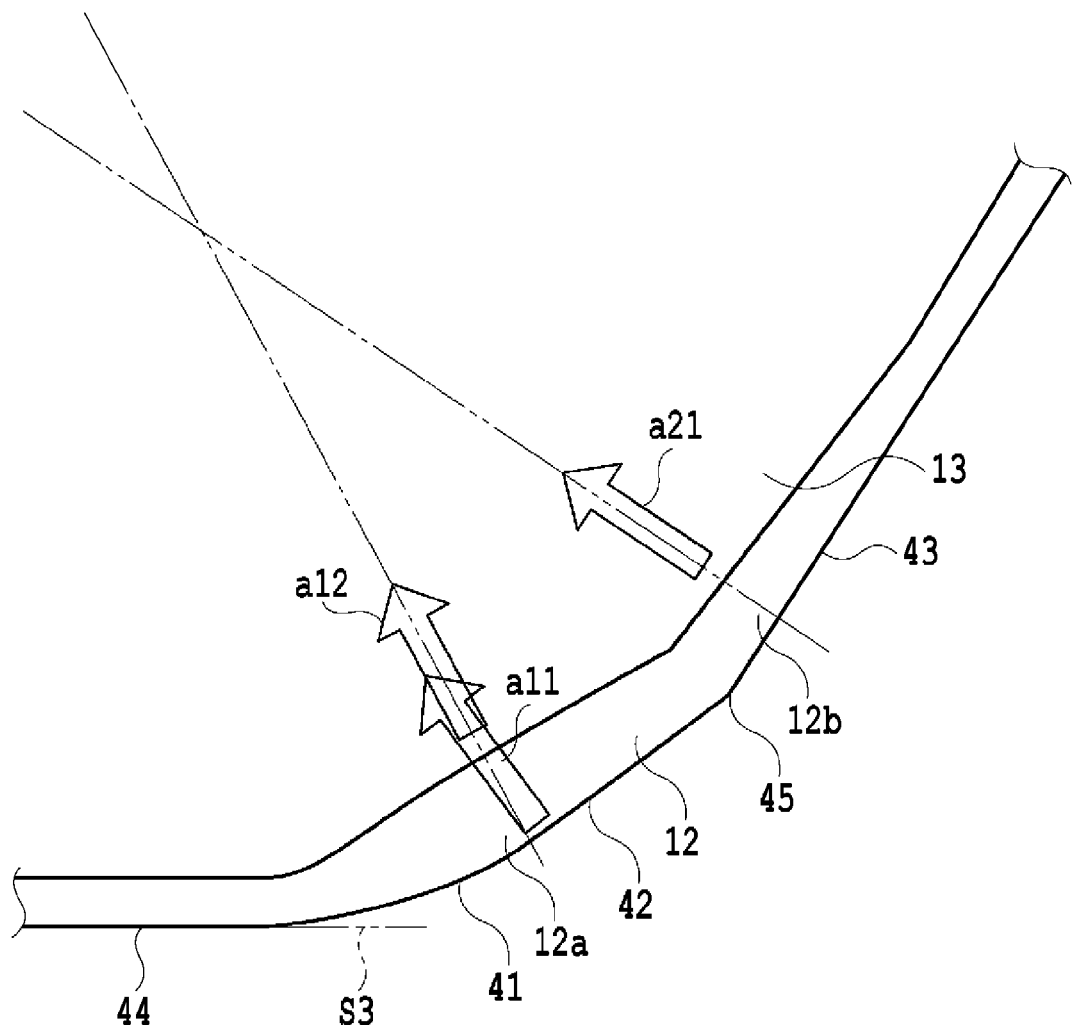
FIG. 12 is a schematic view explaining discharge of chips from an active cutting edge in the cutting tool of FIG. 7.

Specifically, in the present embodiment, the length of the first major cutting edge 42 is about 0.70, the width of the land at a position with the narrowest width is about 0.20 mm, and the width of the land at a position with the widest width is about 0.30 mm, and therefore the rate of increase of the width of the land is about 0.143 (=(0.30−0.20)/0.70). In the present embodiment, the length of the second major cutting edge 43 is about 1.70 mm, the width of the land at a position with the narrowest width is about 0.10 mm, and the width of the land at a position with the widest width is about 0.20 mm, and therefore the rate of increase of the land is about 0.059 (=(0.20−0.10)/1.70). Accordingly, the rate of increase of the width of the first land 12a adjacent to the first major cutting edge 42 is about 2.4 times (≈0.143/0.059) larger than the rate of increase of the width of the second land 12b adjacent to the second major cutting edge 43. The shapes of the first and second lands are schematically shown in FIG. 12.

It should be noted that the width of the rake surface 13 and the width of the connecting inclined surface 16 in the top view of FIG. 3 remain substantially unchanged and are substantially constant throughout the whole circumference of the upper surface 11. The width of the rake surface 13 and the width of the connecting inclined surface 16 are defined in the same way as the width of the lands.

As described above, in accordance with the substantially octagonal shape of the upper and lower surfaces 11, 21, the side surface 31 includes eight side surface portions 31a. Each side surface portion 31a substantially extends between the side edge part 11S of the upper surface and a side edge part 21S extending between corners 21C of the lower surface 21. As shown in FIG. 6, each of the eight side surface portions 31a is provided with the recessed part 32. These recessed parts 32 are connected to each other in the circumferential direction of the cutting insert 1 and form an annular recessed part. The recessed part 32 is formed along the middle plane M and, particularly in the present embodiment, is formed substantially parallel to the middle plane M. Such recessed part includes: a first inclined surface 33 which is inclined so as to face an inner side of the cutting insert 1 from the upper surface 11 side toward the lower surface 21 side; and a second inclined surface 34 located on the lower surface 21 side with respect to the first inclined surface 33 and inclined so as to face the inner side of the cutting insert 1 from the lower surface 21 side toward the upper surface 11 side. In other words, a portion located closer to the lower surface side in the first inclined surface 33 is located closer to the central axis of the through hole 14 and a portion located closer to the upper surface side in the second inclined surface 34 is located closer to the central axis of the through hole 14. Accordingly, the recessed part 32 is defined between the first inclined surface 33 and the second inclined surface 34. The first inclined surface 33 and the second inclined surface 34 are connected via a recessed curved surface 32a. It should be noted that, although the inclination angle of the first inclined surface 33 relative to the middle plane M is the same as the inclination angle of the second inclined surface 34 relative to the middle plane M, the inclination angles may be different from each other.

Figure 7:
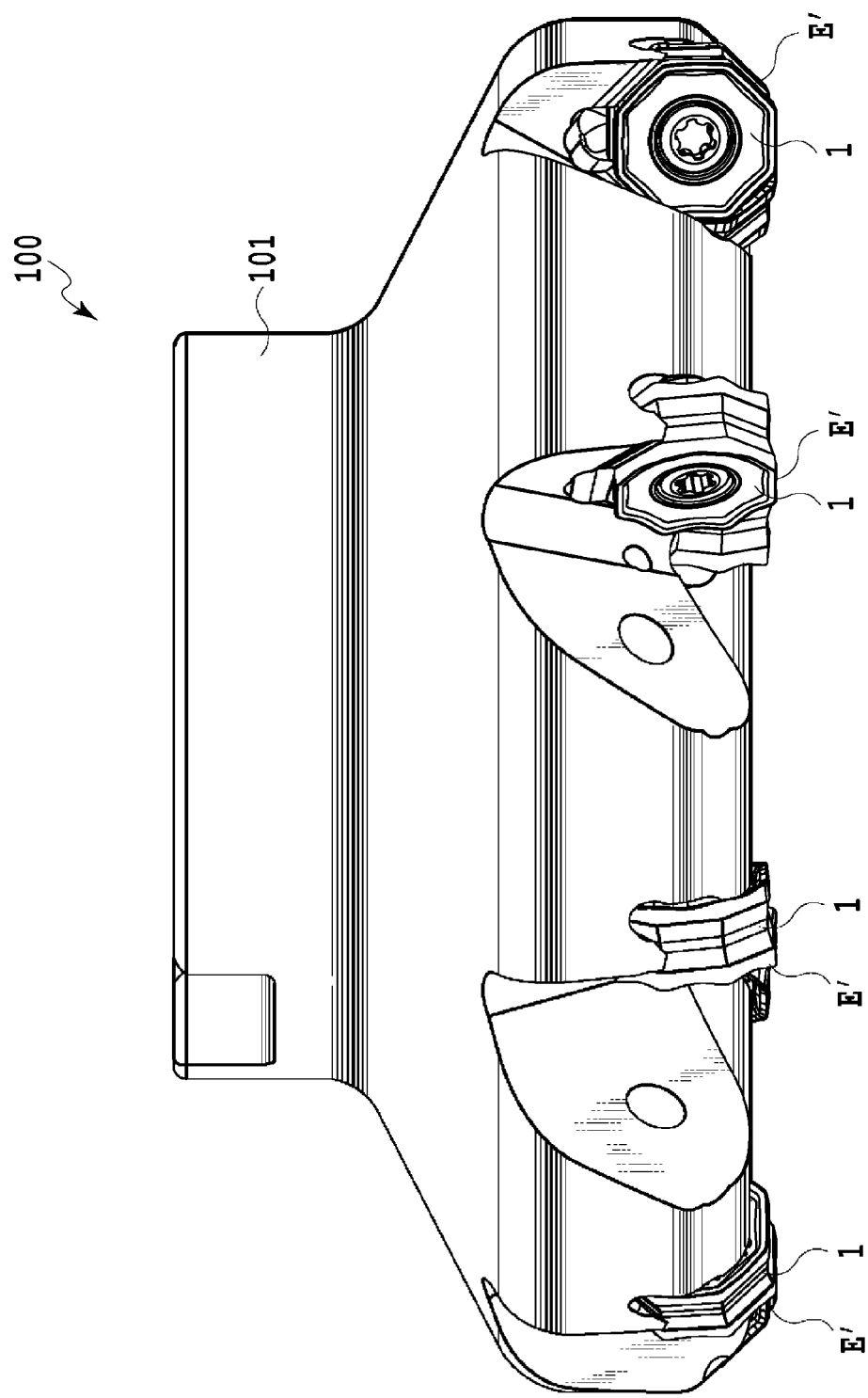
FIG. 7 is a front view of a cutting tool according to an embodiment of the present invention on which the cutting insert of FIG. 1 is mounted.
Figure 8:
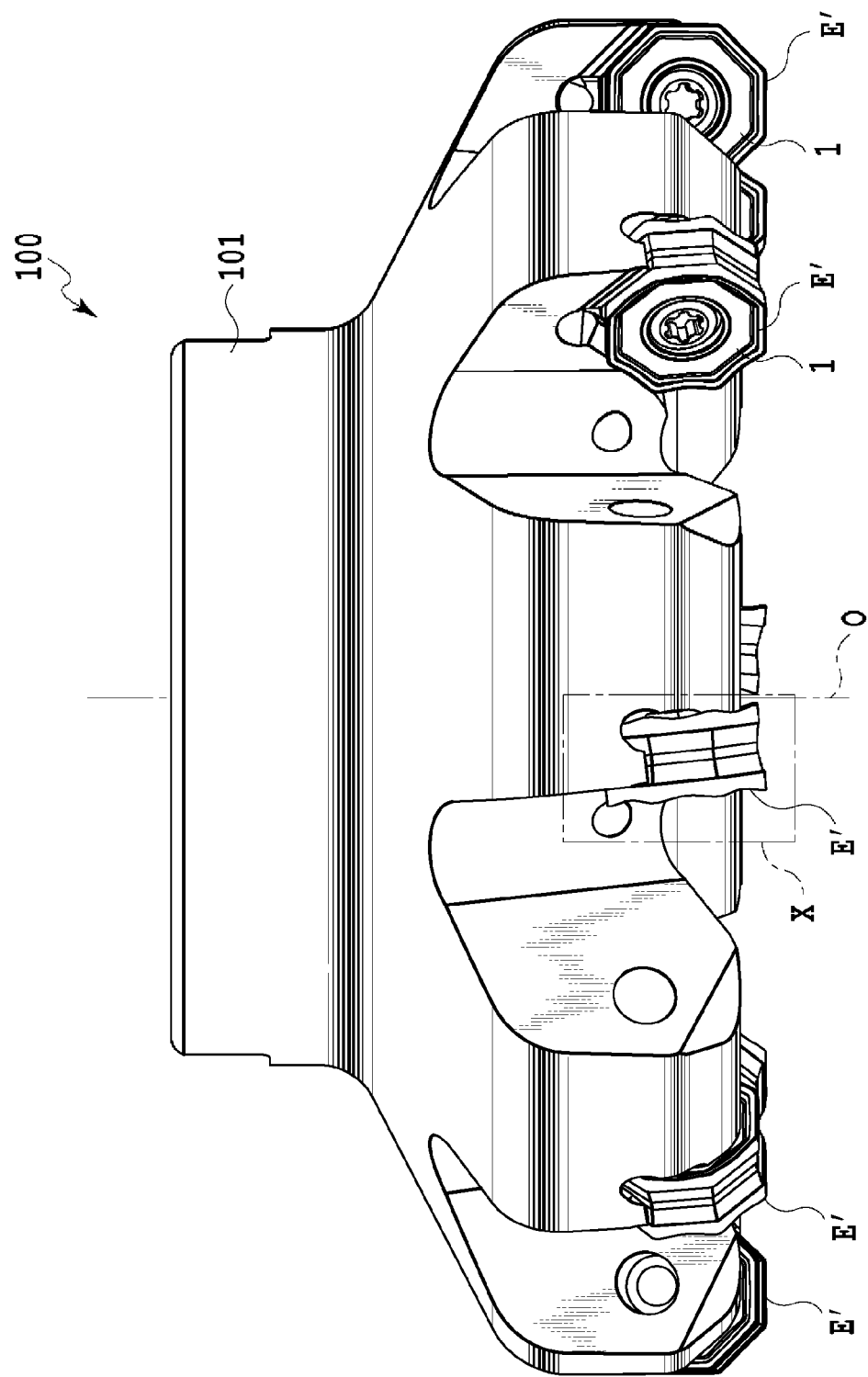
FIG. 8 is a diagram showing the cutting tool of FIG. 7 as viewed from another direction.
Figure 9:
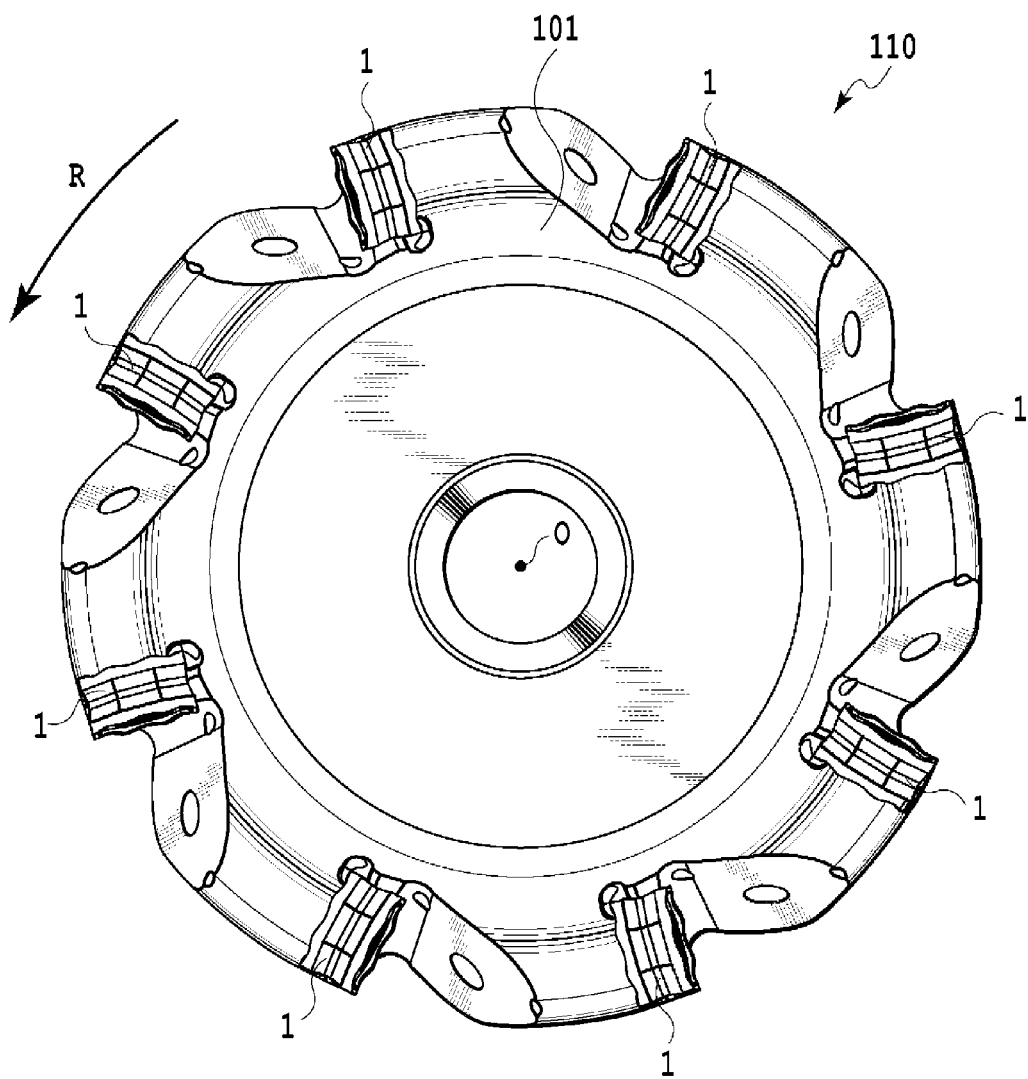
FIG. 9 is a bottom view showing the cutting tool of FIG. 7.
Figure 11:
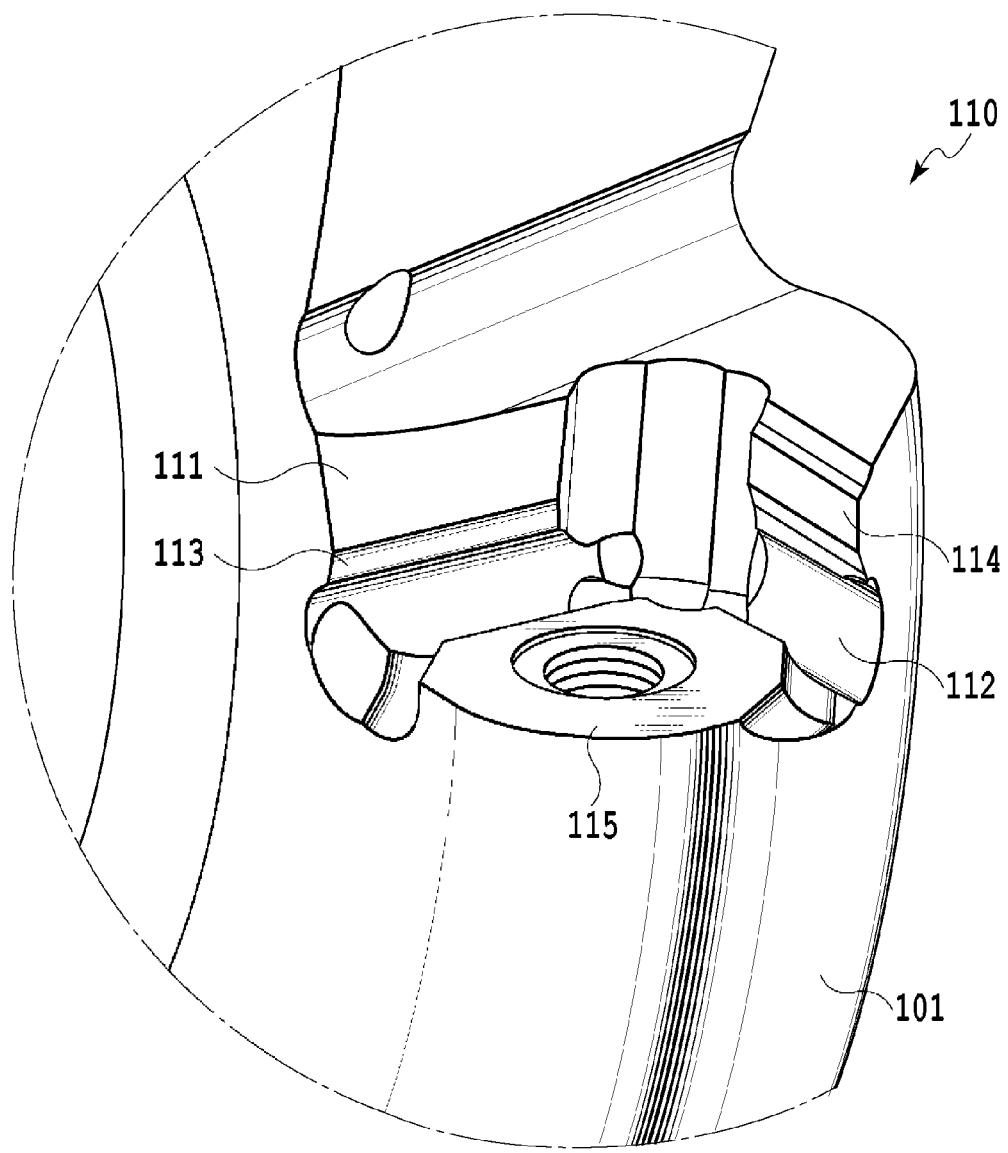
FIG. 11 is an enlarged perspective view showing an insert mounting seat of the cutting tool of FIG. 7.

FIGS. 7 to 9 show a cutting tool 100 on which the cutting insert 1 in the above-described embodiment is mounted. The cutting tool 100 has an axis extending from a leading end side to a base end side and the cutting tool 100 is rotated about this axis as a tool rotational axis and fed to a workpiece. The cutting tool 100 is constituted by a body 101 and a plurality of (in this example, eight) cutting inserts 1. The body 101 has a substantially cylindrical shape, and has an axis O extending from the leading end side toward the base end side, the axis O serving as the tool rotational axis of the cutting tool 100. Insert mounting seats 110 for mounting the cutting inserts 1 are formed at a leading end of the body 101. FIG. 11 shows an insert mounting seat 110.

The insert mounting seat 110 has a bottom wall surface 115, and first and second side wall surfaces 111, 112 extending in directions intersecting with the bottom wall surface 115. A screw hole 115a is formed in the bottom wall surface 115. The first side wall surface 111 faces the leading end side of the tool and an outer circumferential side of the tool. The second side wall surface 112 is located on an outer circumferential side of the body 101 with respect to the first side wall surface 111 and faces the leading end of the tool and the tool rotational axis O side that is different from the outer circumferential side of the tool. The first side wall surface 111 is located side-by-side with the second side wall surface 112 in a circumferential direction about the screw hole 115a in a plane along the bottom wall surface 115, and the first side wall surface 111 and the second side wall surface 112 form an angle of approximately 90 degrees.

The cutting insert 1 located on the insert mounting seat 110 is fixed by a screw. The screw hole 115a formed in the bottom wall surface 115 of the insert mounting seat 110 is formed such that, when the cutting insert 1 is placed on the insert mounting seat 110 and the side surface 31 is in secure contact with the first and second side wall surfaces 111, 112, a central axis of the screw hole 115a is located at a position closer to the first side wall surface 111 side of the insert mounting seat 110 with respect to the central axis of the through hole 14 of the cutting insert 1. With such configuration, when the screw is fastened into the screw hole 115a via the through hole 14 of the cutting insert 1, the cutting insert 1 is pressed against the first side wall surface 111 and the cutting insert 1 is thereby fixed onto the insert mounting seat 110 more rigidly.

Figure 10:
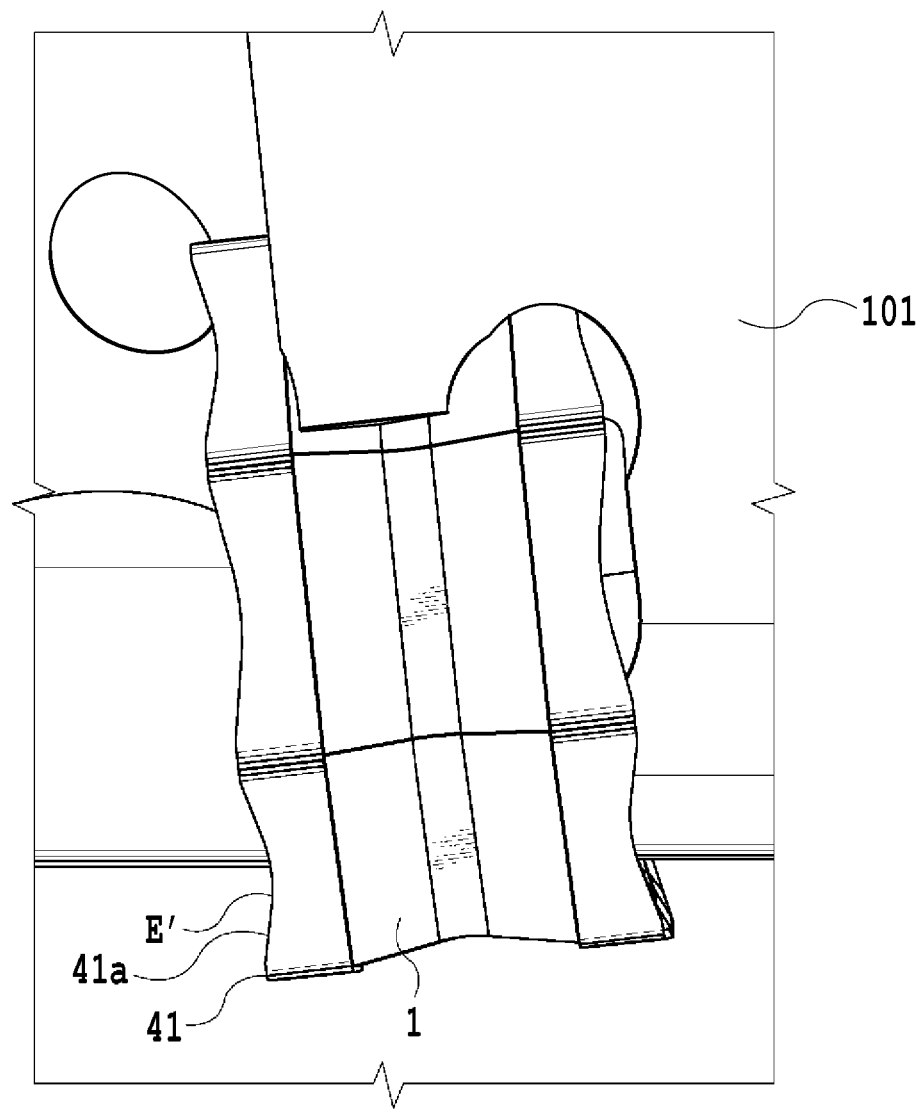
FIG. 10 is an enlarged view showing an area X in FIG. 8.

The cutting insert 1 is a so-called negative type cutting insert 1. In other words, the side surface 31, excluding the recessed part 32, generally extends at an angle of 90 degrees relative to a virtual plane defined so as to be orthogonal to the central axis of the through hole 14, and passes through the cutting edge. Accordingly, as shown in FIGS. 7 to 10, the cutting insert 1 is mounted so as to be inclined forward in a tool rotating direction R in order to provide an appropriate gap (a so-called "clearance") between the workpiece and the side surface 31 of the cutting insert 1. It should be noted that the cutting insert 1 is mounted on the insert mounting seat 110 so as to be inclined forward in the tool rotating direction and this inclination is defined such that the active first corner cutting edge 41 in the active cutting edge E' is located substantially at the foremost position in the tool rotating direction as shown in FIG. 10.

As shown in FIG. 11, the two side wall surfaces 111, 112 of the insert mounting seat 110 are provided with first and second projected parts 113, 114, respectively. These projected parts 113, 114 are each formed substantially parallel to the bottom wall surface 115. Comparing the positions of these two projected parts 113, 114 relative to the bottom wall surface 115 of the insert mounting seat 110, the second projected part 114 formed on the second side wall surface 112 located on the outer circumferential side of the body 101 is formed at a higher position farther away from the bottom wall surface 115 than the first projected part 113 formed on the first side wall surface 111 located closer to the tool rotational axis O. When the cutting insert 1 is mounted on the insert mounting seat 110, the projected part 114 formed at a relatively high position is brought into contact with the first inclined surface 33 of the recessed part 32 formed in one side surface portion 31a of the side surface 31 of the cutting insert 1, and the projected part 113 formed at a relatively low position is brought into contact with the second inclined surface 34 of another recessed part 32 of another side surface portion 31a. Accordingly, the projected part 113 has a contacting surface having an inclination corresponding to the above-mentioned inclination of the second inclined surface 34, and the projected part 114 has a contacting surface having an inclination corresponding to the above-mentioned inclination of the first inclined surface 33. Since the first side wall surface 111 is located side-by-side with the second side wall surface 112 in the circumferential direction about the screw hole 115a in the plane along the bottom wall surface 115, the second inclined surface 34 with which the projected part 113 is brought into contact is located at a position apart from the first inclined surface 33 with which the projected part 114 is brought into contact in the circumferential direction about the through hole 14 of the cutting insert 1.

In particular, the first side wall surface 111 is located substantially at an opposite side of the active cutting edge E' with the through hole 14 interposed therebetween. Accordingly, the projected part 113 is formed such that a mutual contact between the projected part 113 and the second inclined surface 34 exerts a force on the cutting insert in a direction in which the cutting insert 1 is pressed against the bottom wall surface 115 of the insert mounting seat 110. It should be noted that the length of the first side wall surface 111 along the bottom wall surface 115 is formed so as to be longer than the length of the second side wall surface 112 along the bottom wall surface 115, in order to enhance the above-mentioned effects and advantages provided by the projected part 113.

Next, advantageous effects provided by the cutting insert 1 and the cutting tool 100 will be described. Although the following description will be made regarding the active cutting edge E', being one cutting edge 11E, on the upper surface 11, the same applies to the cutting edges 21E on the lower surface 21.

The cutting tool 100 is rotated about the tool rotational axis O and fed to the workpiece. As described with reference to FIG. 10, the active first corner cutting edge 41 in the active cutting edge E' is located substantially at the foremost position in the tool rotating direction. Accordingly, when the active cutting edge E' is cut into the workpiece, the active cutting edge E' is cut into the workpiece gradually from the active first corner cutting edge 41. In such active cutting edge E', the active first major cutting edge 42 is inclined so as to approach the middle plane M as the distance from relevant corner 11C, i.e., from the adjacent active first corner cutting edge 41, increases along the active first major cutting edge 42. The inclination angle of a portion of the rake surface 13 on an inner side of this active first major cutting edge 42 relative to the middle plane M increases toward the active first corner cutting edge 41, and the inclination angle is maximized at a portion of the rake surface 13 on an inner side of the first corner cutting edge 41. In general, the larger the inclination angle of the rake surface relative to the middle plane is, the better the cutting ability provided by the cutting edge. In particular, since the inclination angle of the land 12 relative to the middle plane is constant in the present embodiment, the ease of cutting into the workpiece varies depending on the inclination angle of the rake surface relative to the middle plane. Accordingly, these configurations reduce an impact applied to the active first corner cutting edge 41 when the active first corner cutting edge 41 is cut into the workpiece. This causes the active first corner cutting edge 41 to be less likely to be subjected to heat accumulation. If the amount of heat accumulated in the cutting edge becomes small, softening of, for example, the rake surface 13, being a portion around the cutting edge, is suppressed and the rake surface 13 becomes less likely to suffer from crater wear. Regarding the cutting edge portions located relatively farther away from the active first corner cutting edge 41, since an impact to be applied to such portions when they are cut into the workpiece is inherently relatively small, enhancing the strength of the cutting edge by decreasing the rake angle will prolong the tool life in terms of the cutting edge as a whole. Accordingly, by configuring the inclination angle of the rake surface 13 relative to the middle plane M at a position closer to the active first corner cutting edge 41 so as to be relatively large, it is possible to suppress a deterioration of the active cutting edge E' due to heat and to prolong the tool life of the cutting insert 1.

On the other hand, the second major cutting edge 43 has a recessed curve shape that is recessed toward the lower surface 21, and the lowermost point of the second major cutting edge 43 is located near the middle of the side edge part 11S. Accordingly, when the entire cutting edge, in particular the entire active major cutting edge 41a, is used to perform a cutting process, the cross-sectional shape of the resulting chips is a V-shape. In other words, the chips are each generated in a shape in which the chip is folded at a portion corresponding to the center of the major cutting edge 41a with both ends being lifted up. With the lifting up of the ends of the chips, the chips can easily move away from the portion of the rake surface 13 near the active first corner cutting edge 41 and the frequency and strength of the chips abrading the portion of the rake surface 13 near the active first corner cutting edge 41 can be suppressed. As a result, the heat received by the portion near the active first corner cutting edge 41 due to the abrasion by chips can be suppressed and the degree of impact received from the chips can also be reduced, and the portion of the rake surface 13 near the active first corner cutting edge 41 therefore becomes less likely to suffer from crater wear.

Regarding the connecting part between the contacting surface 15 and the connecting inclined surface 16, the closer the rising angle of the connecting inclined surface 16 relative to the contacting surface 15 is to 90 degrees, the more likely deformation is to occur during the production, more specifically, during sintering of the cutting insert 1. In contrast, if the rising angle is sufficiently smaller than 90 degrees and the connecting inclined surface 16 extends smoothly toward the leading end side of the cutting edge, deformation is less likely to occur during the sintering. Since the first corner cutting edge 41 is farthest away from the middle plane M in the cutting insert 1 of the present embodiment, the height from the contacting surface 15 to the leading end of the cutting edge is maximized at a portion on the inner side of the active first corner cutting edge 41. However, since the inclination angle of the portion of the rake surface 13 on the inner side of the first corner cutting edge 41 is larger than that of the other portions, it is possible to smoothen the rising angle of the portion of the connecting inclined surface 16 connected to the portion of the rake surface 13 on the inner side of the first corner cutting edge 41, as compared to, for example, a configuration in which the inclination angles of the rake surface on the inner side of the first corner cutting edge 41 and that of the rake surface on the inner side of the second corner cutting edge 45 are equal. That is to say, when the width of the rake surface 13 in the top view is designed to be substantially constant as in the cutting insert 1 of the present embodiment, by configuring the inclination angle of the rake surface 13 corresponding to the first corner cutting edge 41 so as to be larger than the inclination angle of the rake surface of the first major cutting edge 42 on the second major cutting edge 43 side, an end of the rake surface 13 that is farther away from the cutting edge is located closer to the contacting surface 15 in the direction of the central axis of the through hole 14, as compared to a case in which the above two inclination angles are configured to be equal, and therefore the rising angle of the connecting inclined surface 16 relative to the contacting surface 15 becomes smoother. Thus, in such cutting insert 1, cracks are less likely to be generated at the connecting portion between the contacting surface 15 and the connecting inclined surface 16 during production. More specifically, during powder compression molding and sintering processes in the production of the cutting insert 1, cracks are less likely to be generated in the above-mentioned portion.

In addition, as described above, the width of the land 12 formed adjacent to the first major cutting edge 42 on the upper surface 11 increases toward the first corner cutting edge 41. In general, chips are discharged to the rake surface 13 along the land 12. Thus, a direction of discharge of the chips is locally orthogonal to a boundary between the land 12 and the rake surface 13. That is to say, the chips generated as a result of the cutting by the active first major cutting edge 42 are first generated in a direction at right angles to the active first major cutting edge (see arrow a11 in FIG. 12). Then, the direction of discharge of the chips changes to a direction at right angles to the intersecting edge between the land 12 adjacent to the active first major cutting edge and the rake surface 13 (see arrow a12 in FIG. 12). The direction of discharge of the arrow a12 is a direction away from a cut surface (see, for example, line S3 in FIG. 12) of the workpiece subjected to the active flat cutting edge 44, relative to the direction of discharge of the arrow a11. Accordingly, chips discharged from the active first corner cutting edge 41 and the active flat cutting edge 44 move away from the active cutting edge relatively rapidly, accompanying the chips generated from a portion of the active first major cutting edge closer to the active first corner cutting edge 41. As a result, the loads on the active first corner cutting edge 41 and the active flat cutting edge 44 are decreased, the load and thermal effect on the active first corner cutting edge 41 are reduced, and the active first corner cutting edge 41 becomes resistant to chipping. Furthermore, since the width of the land 12 is maximized in the vicinity of the active first corner cutting edge 41, the active first corner cutting edge 41 itself is strengthened and the active first corner cutting edge 41 thereby becomes further resistant to chipping. It should be noted that FIG. 12 is a diagram showing only the cutting edge of FIG. 5 and the land 12 adjacent to such cutting edge in the area V in FIG. 3 in an exaggerated manner, for the purpose of explaining the direction of discharge of the chips in the situation when this cutting edge functions as the active cutting edge.

Since the first major cutting edge 42 and the second major cutting edge 43 intersect with each other at an obtuse interior angle θ in FIG. 5, the direction of discharge of the chips discharged from the active first major cutting edge 42 (see the arrow a12 in FIG. 12) and the direction of discharge of the chips discharged from the active second major cutting edge 43 (see arrow a21 in FIG. 12) intersect with each other. In addition, the rate of increase of the width of the land of the first major cutting edge 42 is larger than the rate of increase of the width of the land of the second major cutting edge 43. Accordingly, the direction of discharge of the chips discharged from the active first major cutting edge 42 and the direction of discharge of the chips discharged from the active second major cutting edge 43 intersect with each other at a larger angle. Thus, the chips tend to be discharged toward an area formed by extending a boundary area between the active first major cutting edge 42 and the active second major cutting edge 43 toward the inner side of the cutting insert. In other words, repulsive force will be generated between the chips discharged from the active first major cutting edge 42 and the chips discharged from the active second major cutting edge 43. This enables part of the load applied to the active first major cutting edge 42 to be borne by the active second major cutting edge 43, as compared to a case in which the rate of increase of the width of the land is equal. Specifically, since the chips discharged from the active second major cutting edge 43 that mainly generates chips, due to its relatively long length, push the chips discharged from the active first major cutting edge 42, the load applied to the active first major cutting edge 42 is further reduced. By reducing the load applied to the active first major cutting edge 42, the active first corner cutting edge 41 becomes further resistant to chipping.

Since the major cutting edge 41a formed on the upper surface 11 is inclined so as to approach the middle plane M as the distance from the first corner cutting edge 41 increases, from the first major cutting edge 42 to around the middle of the second major cutting edge 43 in the direction along the cutting edge, the cutting insert 1 can be arranged such that an axial rake angle is set to a positive value and the cutting ability of the active cutting edge is improved.

The recessed part 32 formed on the side surface 31 of the cutting insert 1 of the present embodiment provides an effect of preventing, for example, lifting of the cutting insert 1 due to cutting resistance. Specifically, when cutting force in a direction toward the bottom wall surface 115 of the insert mounting seat 110 is applied to the major cutting edge 41a including the second major cutting edge 43 and the first major cutting edge 42, a portion of the lower surface of the cutting insert 1 which is located generally on the opposite side of the second major cutting edge 43 and the first major cutting edge 42 with the through hole 14 therebetween nearly starts to be lifted up from the bottom wall surface of the insert mounting seat 110. However, since the projected part 113 of the first side wall surface 111 has a contacting surface that forms an acute angle with the bottom wall surface 115 and the second inclined surface 34 of the recessed part 32 forms an acute angle with the lower surface 21, i.e., the bottom wall surface 115, the projected part 113 on the first side wall surface 111 of the insert mounting seat 110 that is in contact with the second inclined surface 34 functions to suppress such lifting.

The projected part 114 on the second side wall surface 112 of the insert mounting seat 110 is brought into contact with the first inclined surface 33 of the recessed part 32 to thereby suppress the lifting on the leading end side of the cutting insert 1 which is generated due to uneven contact between a head of the fastening screw and an inner wall of the through hole 14. In other words, since the central axis of the screw is displaced on the first side wall surface 111 side with respect to the central axis of the through hole 14, the cutting insert 1 receives, from the screw, a moment in a direction in which a portion of the cutting insert 1 which is located on the leading end side of the tool is lifted up. However, since the projected part 114 on the second side wall surface 112 has a contacting surface that forms an obtuse angle with the bottom wall surface 115 and the first inclined surface 33 of the recessed part 32 forms an obtuse angle with the lower surface 21, i.e., the bottom wall surface 115, the projected part 114 that is in contact with the first inclined surface 33 inversely applies a moment in a direction in which the portion located on the leading end side of the tool of the cutting insert 1 is pressed against the bottom wall surface 115 side of the insert mounting seat 110. As a result, the lifting of the cutting insert 1 is prevented.

Although the present invention has been described based on the above-mentioned embodiment, the present invention is not limited to the above-mentioned embodiment. The present invention may employ various forms other than the above-mentioned embodiment without departing from the gist of the invention. For example, although the basic shape of the cutting insert in a top view is octagonal in the above-mentioned embodiment, other polygonal shapes, such as triangles, quadrangles, pentagons and hexagons, may be employed.

Although the cutting insert 1 is of negative type in the present embodiment, it may be of a so-called positive type. In other words, the side surface 31 may have an insert interior acute angle relative to the virtual plane defined so as to be orthogonal to the central axis of the through hole 14 and pass through the cutting edge.

The second major cutting edge 43, the first major cutting edge 42 and the flat cutting edge 44 do not have to be formed in a linear form in the top view as in the above-mentioned embodiment and they may be formed in a curved form. If these cutting edge portions are in a curved form, the various angles may be defined by using a chord formed by connecting ends of each of such cutting edge portions.

Although the angle θ formed by the second major cutting edge 43 and the first major cutting edge 42 is set to 175 degrees in the above-mentioned embodiment, the angle is not limited thereto. It has been verified that a sufficient effect can be obtained by setting the angle θ formed by the second major cutting edge 43 and the first major cutting edge 42 to 130 degrees≤θ<180 degrees.

Although the rate of increase of the width of the first land 12a adjacent to the first major cutting edge 42 in the above-mentioned embodiment is about 2.4 times larger than the rate of increase of the width of the second land 12b adjacent to the second major cutting edge 43, the rate of increase is not limited to such value. It has been verified that a sufficient effect can be obtained by configuring the rate of increase for the first land of the first major cutting edge 42 so as to be about two to five times larger than the rate of increase for the second land of the second major cutting edge 43.

Although the inclination angle of the land relative to the middle plane is set to 5 degrees in the above-mentioned embodiment, the inclination angle is not limited to such value. The inclination angle of the land may be changed as appropriate depending on the manner of use of the cutting insert. Similarly, the inclination angle of the rake surface relative to the middle plane may also be changed as appropriate. However, the inclination angle of the rake surface should be set based on both the thermal effect on and the cutting ability of the active first corner cutting edge.

The present invention includes modifications, applications and equivalents encompassed by the idea of the present invention defined by the scope of the claims.

What is claimed is:

1. A cutting insert, comprising:
a first end surface and a second end surface opposing the first end surface;
a side surface connecting the first end surface and the second end surface; and
at least one cutting edge extending on an intersecting edge between the first end surface and the side surface, each cutting edge of the at least one cutting edge including:
a corner cutting edge extending at a corner of the first end surface; a major cutting edge connected to the corner cutting edge; and a minor cutting edge connected to the corner cutting edge on an opposite side of the cutting corner from the major cutting edge, wherein:
the first end surface is provided with a rake surface along a respective cutting edge of the at least one cutting edge, the rake surface being inclined toward the second end surface as a distance from the respective cutting edge the at least one cutting edge increases;
in a side view of the cutting insert, the major cutting edge includes an inclined part which is inclined so as to approach the second end surface from the corner cutting edge;
a portion of the rake surface along the inclined part is formed such that an angle of inclination with respect to the second end surface increases as the portion of the rake surface along the inclined part approaches the corner in a direction along the intersecting edge between the first end surface and the side surface;
as viewed from a top view of the first surface end, the major cutting edge has a first major cutting edge portion and a second major cutting edge portion that forms an obtuse interior angle (θ) with the first major cutting edge portion, the first major cutting edge portion is connected to the corner cutting edge, and the second major cutting edge portion extends on a side, opposite to the corner cutting edge, of the first major cutting edge portion;
the inclined part extends from the first major cutting edge portion to part of the second major cutting edge portion; and
the first end surface is provided with a land between the respective cutting edge of the at least one cutting edge and the rake surface, such that a width of a portion of the land adjacent to the major cutting edge becomes larger as the portion of the land approaches the corner with which the major cutting edge is associated; wherein
in the land, a width of a portion of a first land extending between the first major cutting edge portion and the rake surface increases as the portion of the first land approaches the corner; and
a width of a portion of a second land extending between the second major cutting edge portion and the rake surface increases as the portion of the second land approaches the corner.

2. The cutting insert according to claim 1, wherein, in the side view of the cutting insert, the major cutting edge is curved so as to be recessed toward the second end surface and approaches closest to the second end surface in the second major cutting edge portion.

3. The cutting insert according to claim 1, wherein a rate of increase of the width of the first land is larger than a rate of increase of the width of the second land.

4. The cutting insert according to claim 1, wherein the first major cutting edge portion is shorter than the second major cutting edge portion.

5. The cutting insert according to claim 1, wherein:
as viewed from the direction facing the first end surface, an interior angle (γ) of the corner is smaller than the interior angle (θ) between the first major cutting edge portion and the second major cutting edge portion.

6. The cutting insert according to claim 1, further comprising a through hole that penetrates the first end surface and the second end surface, wherein:
the at least one cutting edge is a number N cutting edges extending on the intersecting edge between the first end surface and the side surface are arranged in a rotational N-fold symmetry about a central axis of the through hole based on the number of cutting edges; and
the cutting insert is 180-degree rotationally symmetric about an axis that is orthogonal to the central axis of the through hole.

7. The cutting insert according to claim 1, wherein:
a first inclined surface and a second inclined surface are formed in the side surface, the second inclined surface being arranged on a second end surface side with respect to the first inclined surface and located apart from the first inclined surface in a circumferential direction of the cutting insert;
the first inclined surface is inclined so as to face an inner side of the cutting insert as a distance to the second end surface decreases; and
the second inclined surface is inclined so as to be located on the inner side of the cutting insert as a distance to the first end surface decreases.

8. An indexable polygonal cutting insert comprising:
an upper surface, a lower surface, a side surface connecting the upper and lower surfaces, a middle plane (M) midway between the upper and lower surfaces, and a through hole connecting the upper and lower surfaces and having a center axis (A1) of rotational symmetry;
a plurality of cutting edges formed between the upper surface and the side surface, each cutting edge of the plurality of cutting edges being associated with a corner of the polygonal insert and including:
a corner cutting edge;
a major cutting edge connected to a first side of the corner cutting edge;
a minor cutting edge connected on a second side of the corner cutting edge opposite from the major cutting edge;
a rake surface provided on the upper surface along said each cutting edge, the rake surface being inclined in a direction of the lower surface; and
a land located between said each cutting edge and the rake surface;
wherein:
in a top view of the cutting insert:
the major cutting edge has a first major cutting edge portion connected to a second major cutting edge portion, the first major cutting edge portion being closer to the corner cutting edge than the second major cutting edge portion, the first major cutting edge portion forming an obtuse interior angle (θ) with the second major cutting edge portion; and
a portion of the land adjacent to the major cutting edge becomes larger as the portion of the land approaches the corner with which the major cutting edge is associated;
in a side view of the cutting insert:
the major cutting edge includes an inclined part which is inclined from the corner cutting edge in a direction of the lower surface, the inclined part extending from the first major cutting edge portion to part of the second major cutting edge portion;

along the inclined part of the major cutting edge, a portion of the rake surface has an angle of inclination with respect to the lower surface which increases as the portion of the rake surface along the inclined part approaches the corner with which the major cutting edge is associated;
the land includes a first land extending between the first major cutting edge portion and the rake surface;
the land includes a second land extending between the second major cutting edge portion and the rake surface; and
widths of portions of the first and second lands both increase as the portions of the first and second lands approach the corner.

9. The cutting insert according to claim 8, wherein, in the side view of the cutting insert:
the corner is further from the middle plane (M) than; the second major cutting edge portion of each major cutting edge.

10. The cutting insert according to claim 8, wherein a rate of increase of the width of the first land portion is larger than a rate of increase of the width of the second land.

11. The cutting insert according to claim 8, wherein the first major cutting edge portion is shorter than the second major cutting edge portion.

12. The cutting insert according to claim 8, wherein:
in the top view of the cutting insert, an interior angle (γ) of the corner is smaller than the interior angle (θ) between the first major cutting edge portion and the second major cutting edge portion.

13. The cutting insert according to claim 8, wherein:
the upper and lower surfaces are identical; and
the cutting insert is 180-degree rotationally symmetric about an axis (A2) that is orthogonal to the central axis (A1) of the through hole.

14. The cutting insert according to claim 8, wherein:
the side surface comprises a plurality of side surface portions, each provided with a recessed part, the recessed parts being connected to one another in a circumferential direction of the cutting insert;
each recessed part includes a first inclined surface located between the middle plane (M) and the upper surface, and a second inclined surface between the middle plane (M) and the lower surface; and
the first and second inclined surfaces converge in an inward direction of the cutting insert, as they approach the middle plane (M).

15. A cutting tool, comprising:
a body; and
an eight-sided cutting insert according to claim 14 removably mounted to the body.

16. The cutting tool according to claim 15, wherein
the body comprises an insert mounting seat in which the cutting insert is removably mounted;
the insert mounting seat includes a first side wall surface having a first projected part;
the first projected part contacts the second inclined surface formed in the cutting insert's side surface.

17. The cutting tool according to claim 16, wherein
an outer contour of the body is substantially cylindrical;
the insert mounting seat further includes a second side wall surface located on an outer circumferential side of the body with respect to the first side wall surface, the second side wall surface having a second projected part;
the second projected part contacts the first inclined surface formed in the cutting insert's side surface.

18. A cutting tool, comprising:
a body; and
an eight-sided cutting insert according to claim 8 removably mounted to the body.

* * * * *